US011491864B2

(12) United States Patent
Okazaki et al.

(10) Patent No.: US 11,491,864 B2
(45) Date of Patent: Nov. 8, 2022

(54) FUEL TANK SYSTEM FOR VEHICLE AND ABNORMALITY DIAGNOSIS METHOD OF THE FUEL TANK SYSTEM

(71) Applicant: SUBARU CORPORATION, Tokyo (JP)

(72) Inventors: Kazuya Okazaki, Tokyo (JP); Tetsuya Kaneko, Tokyo (JP); Tomokazu Mori, Tokyo (JP); Akihiro Takemura, Tokyo (JP); Fumihiro Nei, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 14 days.

(21) Appl. No.: 17/307,391

(22) Filed: May 4, 2021

(65) Prior Publication Data

US 2021/0370761 A1     Dec. 2, 2021

(30) Foreign Application Priority Data

May 29, 2020     (JP) .............................. JP2020-094780

(51) Int. Cl.
*B60K 15/035*     (2006.01)
*G07C 5/08*     (2006.01)
(Continued)

(52) U.S. Cl.
CPC .... *B60K 15/03504* (2013.01); *B01D 53/0415* (2013.01); *B60K 15/04* (2013.01); *G07C 5/0808* (2013.01); *B01D 2253/102* (2013.01); *B01D 2257/702* (2013.01); *B01D 2259/4516* (2013.01); *B60K 15/03519* (2013.01);
(Continued)

(58) Field of Classification Search
CPC ............ B60W 20/00; F02D 2009/0247; F02D 2041/0095; F02D 19/025; F02D 19/0623; F02D 41/22; F02D 19/0621; F02D 41/003; F02D 41/0032; F02D 41/0037;
(Continued)

(56) References Cited

U.S. PATENT DOCUMENTS

| 5,237,979 A * | 8/1993 | Hyodo ................ F02D 41/0045 |
| | | 123/520 |
| 2002/0161495 A1* | 10/2002 | Yamaki .................. G07C 5/008 |
| | | 701/33.8 |
| 2012/0118273 A1* | 5/2012 | Kim ...................... F02M 25/08 |
| | | 123/520 |

FOREIGN PATENT DOCUMENTS

JP     H02-102822 A     4/1990

* cited by examiner

*Primary Examiner* — John Kwon
(74) *Attorney, Agent, or Firm* — McGinn IP Law Group, PLLC

(57) ABSTRACT

A fuel tank system for a vehicle includes a fuel tank, a fuel supply passage, a canister, an evaporated fuel gas supply passage, a communication passage, a backflow prevention device, first and second pressure measurement devices, and a control device. The fuel tank stores fuel supplied by the fuel supply passage. The canister adsorbs evaporated fuel gas generated in the fuel tank and supplied through the evaporated fuel gas supply passage. The backflow prevention device is provided in a pipe line of the fuel supply passage, and prevents a backflow of the fuel from the fuel tank. The first and second pressure measurement devices respectively measure pressures in the fuel supply passage and the evaporated fuel gas supply passage. The control device diagnoses the communication passage as being blocked when a difference between pressure values measured by the first and second pressure measurement devices exceeds a predetermined value.

5 Claims, 5 Drawing Sheets

(51) Int. Cl.
 *B60K 15/04* (2006.01)
 *B01D 53/04* (2006.01)
 *B60K 15/03* (2006.01)
(52) U.S. Cl.
 CPC ................. *B60K 2015/0321* (2013.01); *B60K 2015/03514* (2013.01)
(58) Field of Classification Search
 CPC .... F02D 41/004; F02D 41/0045; F02N 11/08; F02M 25/0836
 See application file for complete search history.

FUEL TANK SYSTEM FOR VEHICLE AND ABNORMALITY DIAGNOSIS METHOD OF THE FUEL TANK SYSTEM

CROSS-REFERENCE TO RELATED APPLICATIONS

The present application claims priority from Japanese Patent Application No. 2020-094780 filed on May 29, 2020, the entire contents of which are hereby incorporated by reference.

BACKGROUND

The disclosure relates to a fuel tank system of a vehicle and an abnormality diagnosis method thereof, and specifically relates to a fuel tank system of a vehicle that is provided with a fuel supply passage configured to supply fuel to a fuel tank, an evaporated fuel gas supply passage that couples the fuel tank to a canister, and a communication passage that communicates between the fuel supply passage and the evaporated fuel gas supply passage, and an abnormality diagnosis method thereof.

Hitherto, in fuel tank systems of a vehicle, evaporated fuel gas (hereinafter, referred to as "evaporated gas") generated in the fuel tank contains hazardous substances that cause the air pollution, so that the evaporated fuel gas is filtered by a canister (evaporated fuel gas discharge control), and then processed.

Meanwhile, the fuel (for example, gasoline) to be stored in the fuel tank has properties of easy evaporation when the mixing amount of air (mixing amount of fresh air) is large (properties of the generation amount of the evaporated gas being increased), and in particular, it is notable to reduce the amount of air to be flowed in from a fuel inlet (filler neck) in supply of fuel to the fuel tank (hereinafter, also referred to as "supply oil").

Therefore, in the related art, as a method of preventing such mixing of the air, a technique of communicating between a fuel inlet side in a fuel supply passage (filler pipe) and an evaporated gas supply passage that couples a fuel tank to a canister (hereinafter, a pipe line that communicates between the fuel supply passage and the evaporated gas supply passage is referred to as a "communication passage") has been employed (see Japanese Unexamined Patent Application Publication No. H02-102822).

With such a technique, it is possible to recirculate the evaporated gas generated in the fuel tank in supply oil via the evaporated gas supply passage and the communication passage via to the fuel inlet side of the fuel supply passage (filler pipe), so that it is possible to reduce the air inflow amount that is flowed in from the fuel inlet, and eventually to reduce the generation amount of the evaporated gas.

SUMMARY

An aspect of the disclosure provides a fuel tank system for a vehicle. The fuel tank system includes a fuel tank, a fuel supply passage, a canister, an evaporated fuel gas supply passage, a communication passage, a backflow prevention device, a first pressure measurement device, a second pressure measurement device, and a control device. The fuel tank is configured to store fuel. The fuel supply passage is configured to supply the fuel to the fuel tank. The canister is configured to adsorb evaporated fuel gas generated in the fuel tank. The evaporated fuel gas supply passage couples the fuel tank to the canister. The evaporated fuel gas supply passage is configured to supply the evaporated fuel gas in the fuel tank to the canister. The communication passage fluidly connects the fuel supply passage and the evaporated fuel gas supply passage. The backflow prevention device is provided in a pipe line of the fuel supply passage between the fuel tank and the communication passage. The backflow prevention device is configured to prevent a backflow of the fuel from the fuel tank. The first pressure measurement device is configured to measure a pressure in the fuel supply passage. The second pressure measurement device is configured to measure a pressure in the evaporated fuel gas supply passage. The control device is configured to diagnose a blockage state of the communication passage on a basis of a first pressure value measured by the first pressure measurement device and a second pressure value measured by the second pressure measurement device. The control device is configured to diagnose the communication passage as being blocked when a differential pressure between the first pressure value and the second pressure value exceeds a predetermined reference differential pressure value.

An aspect of the disclosure provides an abnormality diagnosis method of diagnosing an abnormality of a fuel tank system of a vehicle. The method includes diagnosing a blockage state of a communication passage. The fuel tank system includes a fuel tank, a fuel supply passage, a canister, an evaporated fuel gas supply passage, the communication passage, a backflow prevention device, a first pressure measurement device, and a second pressure measurement device. The fuel tank is configured to store fuel. The fuel supply passage is configured to supply the fuel to the fuel tank. The canister is configured to adsorb evaporated fuel gas generated in the fuel tank. The evaporated fuel gas supply passage couples the fuel tank to the canister. The evaporated fuel gas supply passage is configured to supply the evaporated fuel gas in the fuel tank to the canister. The communication passage fluidly connects the fuel supply passage and the evaporated fuel gas supply passage. The backflow prevention device is provided in a pipe line of the fuel supply passage between the fuel tank and the communication passage. The backflow prevention device is configured to prevent a backflow of the fuel from the fuel tank. The first pressure measurement device is configured to measure a pressure in the fuel supply passage. The second pressure measurement device is configured to measure a pressure in the evaporated fuel gas supply passage. The diagnosing includes diagnosing the communication passage as being blocked when a differential pressure between a first pressure value measured by the first pressure measurement device and a second pressure value measured by the second pressure measurement device exceeds a predetermined reference differential pressure value.

An aspect of the disclosure provides a fuel tank system for a vehicle. The fuel tank system includes a fuel tank, a fuel supply passage, a canister, an evaporated fuel gas supply passage, a communication passage, a backflow prevention device, a first pressure measurement device, a second pressure measurement device, and circuitry. The fuel tank is configured to store fuel. The fuel supply passage is configured to supply the fuel to the fuel tank. The canister is configured to adsorb evaporated fuel gas generated in the fuel tank. The evaporated fuel gas supply passage couples the fuel tank to the canister. The evaporated fuel gas supply passage is configured to supply the evaporated fuel gas in the fuel tank to the canister. The communication passage fluidly connects the fuel supply passage and the evaporated fuel gas supply passage. The backflow prevention device is provided in a pipe line of the fuel supply passage between the fuel tank and the communication passage. The backflow prevention device is configured to prevent a backflow of the fuel from the fuel tank. The first pressure measurement device is configured to measure a pressure in the fuel supply passage. The second pressure measurement device is configured to measure a pressure in the evaporated fuel gas supply passage. The control device is configured to diagnose a blockage state of the communication passage on a basis of a first pressure value measured by the first pressure measurement device and a second pressure value measured by the second pressure measurement device. The circuitry is configured to diagnose the communication passage as being blocked when a differential pressure between the first pressure value and the second pressure value exceeds a predetermined reference differential pressure value.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

When a communication passage is blocked due to accumulation, crushing, and the like of powder dust, as a result of the increased generation amount of evaporated gas, the canister is likely to be degraded, and a problem of air pollution occurs when the canister is continuously used without noticing that the adsorption limit of evaporated fuel gas that the canister is capable of adsorbing has exceeded (breakthrough of the canister).

It is desirable to provide a fuel tank system of a vehicle capable of grasping a blockage state of a communication passage that communicates between a fuel supply passage and an evaporated fuel gas supply passage, and an abnormality diagnosis method thereof.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
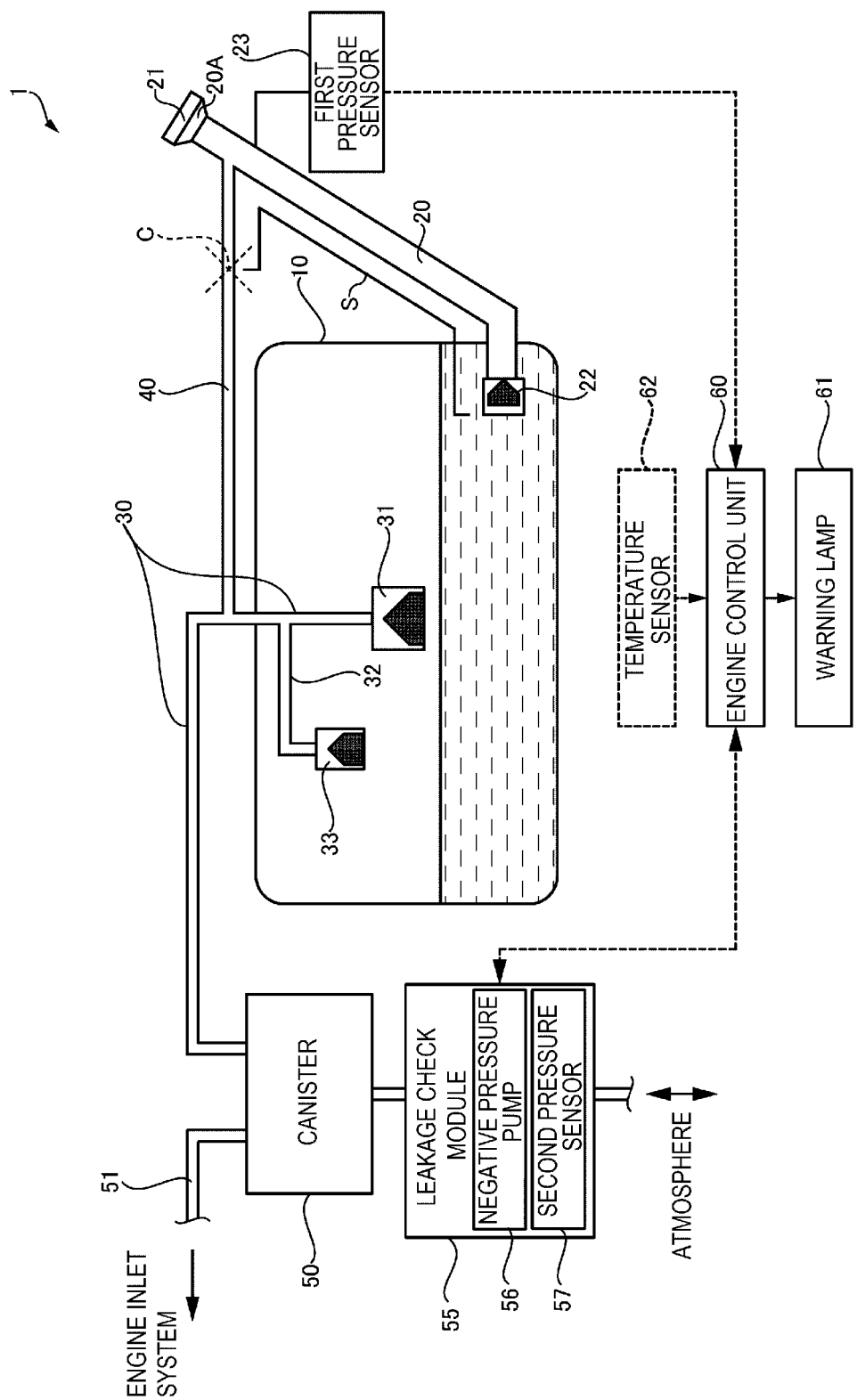
FIG. 1 is a schematic diagram illustrating an outline of a fuel tank system of a vehicle according to an embodiment.
Figure 2:
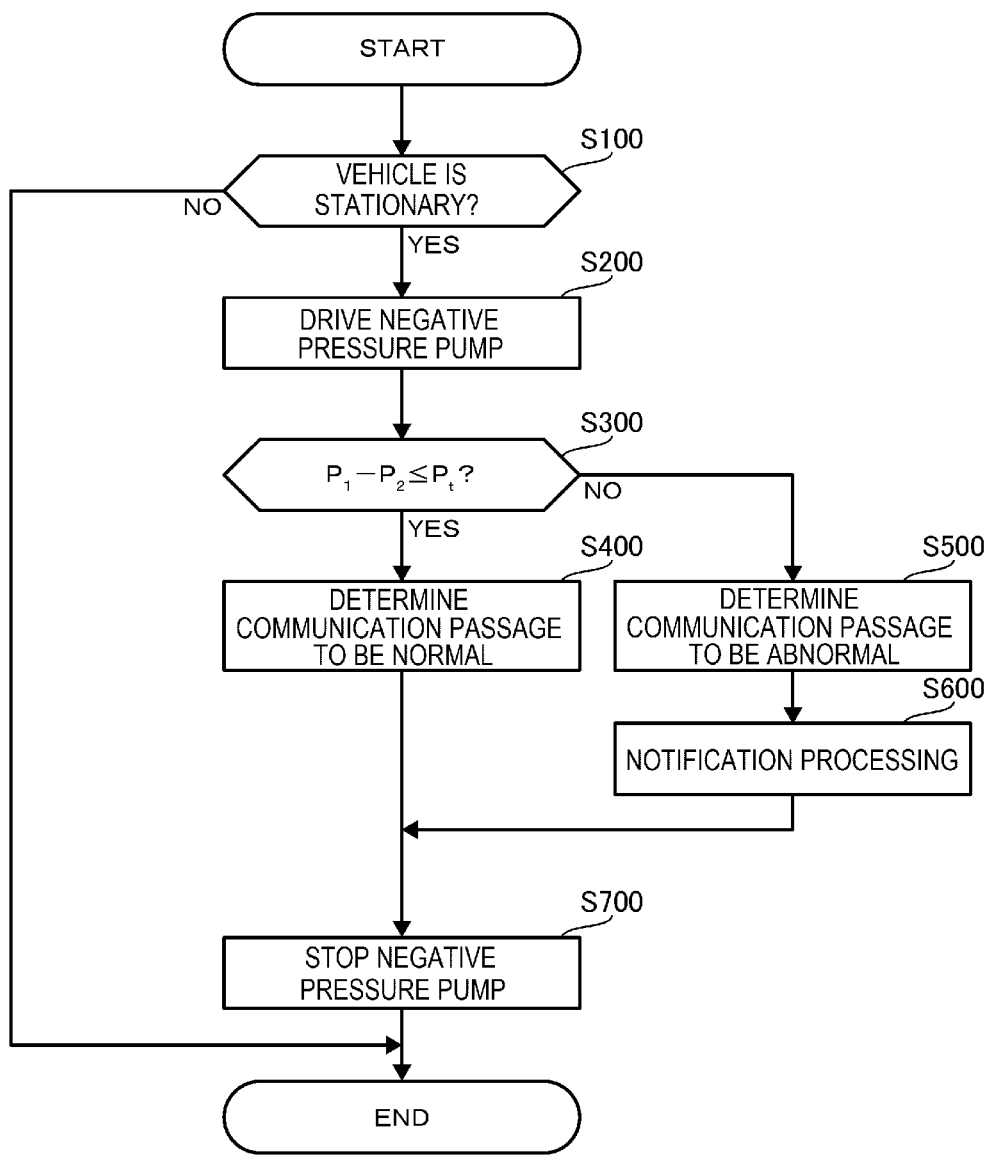
FIG. 2 is a flowchart of an abnormality diagnosis control process indicating an example of an abnormality diagnosis method according to the embodiment.
Figure 3:
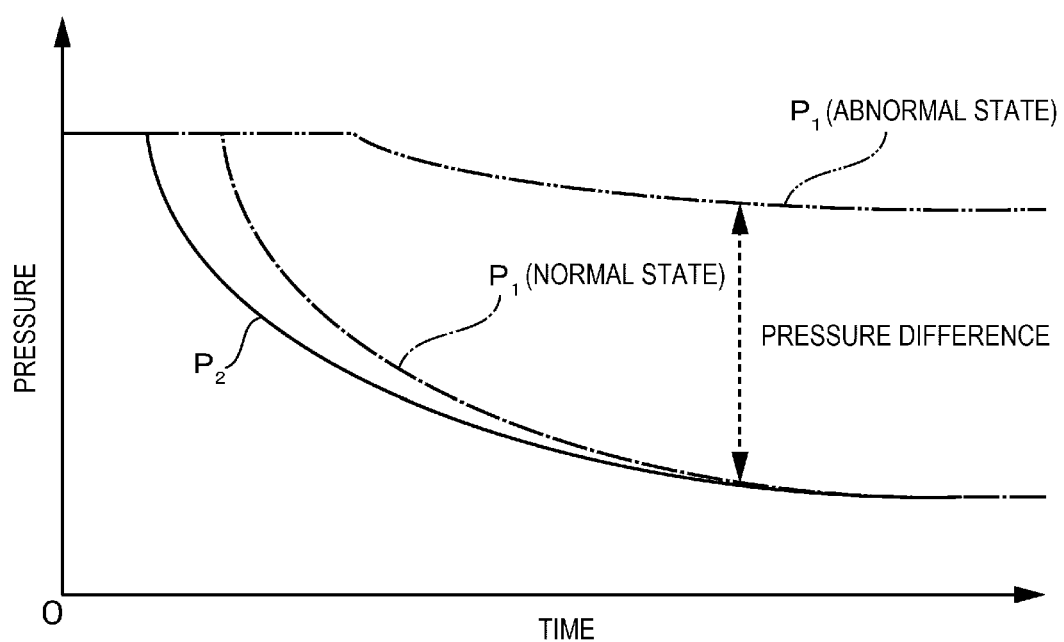
FIG. 3 is a graph illustrating transition of a pressure in a filler pipe and transition of a pressure in an evaporated gas supply passage, in an abnormality diagnosis.

FIG. 1 is a schematic diagram illustrating an outline of a fuel tank system of a vehicle according to an embodiment. FIG. 2 is a flowchart of an abnormality diagnosis control process indicating an example of an abnormality diagnosis method according to the embodiment. FIG. 3 is a graph illustrating transition of a pressure in a filler pipe and transition of a pressure in an evaporated gas supply passage, in an abnormality diagnosis.

Configuration of Fuel Tank System 1

As illustrated in FIG. 1, a fuel tank system 1 according to the embodiment is provided to a vehicle (for example, automobile) that uses an engine (internal combustion engine, not illustrated) as a drive source, and is provided with a fuel tank 10, a filler pipe 20, an evaporated gas supply passage 30, a communication passage 40, a canister 50, and an engine control unit 60. In one example, the fuel tank system 1, the vehicle, the fuel tank 10, the filler pipe 20, the evaporated gas supply passage 30, the communication passage 40, the canister 50, and the engine control unit 60 may respectively serve as a "fuel tank system", a "vehicle", a "fuel tank", a "fuel supply passage", a "evaporated fuel gas supply passage", a "communication passage", a "canister", and a "control device".

Fuel Tank 10

The fuel tank 10 is a tank that stores fuel (for example, gasoline) of the engine (not illustrated), and in the embodiment, the filler pipe 20 and the evaporated gas supply passage 30 are respectively penetrated through and coupled to a lower end side of a side surface portion and an upper surface portion.

In the embodiment, the evaporated gas generated in the fuel tank 10 is emitted to an outside of the fuel tank 10 via the evaporated gas supply passage 30. In one example, the abovementioned evaporated gas may serve as a "evaporated fuel gas".

Filler Pipe 20

The filler pipe 20 is a pipe line for supplying fuel to the fuel tank 10. The filler pipe 20 has a fuel inlet 20A (filler neck) into which the fuel is injected, at an upper end portion of the filler pipe 20. A known filler cap 21 capable of sealing the fuel inlet 20A with good airtightness is attached to the fuel inlet 20A.

Moreover, in the filler pipe 20 according to the embodiment, the communication passage 40 is branch coupled to a position adjacent to the fuel inlet 20A.

As will be described in details later, the communication passage 40 causes the evaporated gas generated in the fuel tank 10 in supply oil to recirculate to a side of the fuel inlet 20A of the filler pipe 20 to reduce an inflow amount of air that flows into from the fuel inlet 20A.

A lower end portion of the filler pipe 20 is opened at a position nearer to a bottom surface in the fuel tank 10, and a backflow prevention valve 22 is attached to a tip thereof.

The backflow prevention valve 22 is a valve (so-called check valve) for preventing a backflow of the fuel in the fuel tank 10 to the fuel inlet 20A, and is configured to be opened when the fuel flows into the fuel tank 10 (in supply oil), and to be closed in the other states. In one example, the abovementioned backflow prevention valve 22 may serve as a "backflow prevention device".

In addition, at an appropriate position in the filler pipe 20, a first pressure sensor 23 that measures the pressure in the filler pipe 20 is attached. In one example, the abovementioned first pressure sensor 23 may serve as a "first pressure measurement device".

Evaporated Gas Supply Passage 30

The evaporated gas supply passage 30 is a pipe line for coupling the fuel tank 10 to the canister 50, and guiding evaporated gas generated in the fuel tank 10 to the canister 50.

In particular, evaporated gas is supplied to the canister 50 via the evaporated gas supply passage 30:
(a) when an inside of the pipe line is made to be a negative pressure by a negative pressure pump 56, which is described later, being driven;
(b) when the pressure in the fuel tank 10 increases by the inflow (inflow pressure) of fuel via the filler pipe 20 to the fuel tank 10; and
(c) when evaporated gas is generated by a change in the fuel temperature.

In the evaporated gas supply passage 30 according to the embodiment, one end is penetrated through and coupled to an upper portion of the fuel tank 10, and has a tip to which a fill-up regulation valve 31 is attached. Moreover, in the fuel tank 10, a branched pipe line 32 is branch coupled to the evaporated gas supply passage 30, and has a tip to which a rollover valve 33 is attached. Note that, the branched pipe line 32 may be branch coupled to the evaporated gas supply passage 30 outside the fuel tank 10.

The fill-up regulation valve 31 is closed when the fuel amount in the fuel tank 10 becomes a fill-up state to prevent the fuel from flowing into the evaporated gas supply passage 30, and is opened in the other states to allow the evaporated gas to flow into the evaporated gas supply passage 30. Moreover, the rollover valve 33 is closed when the vehicle is inclined or overturned to prevent the fuel from flowing into the branched pipe line 32, and is opened in the other states to allow the evaporated gas to flow into the branched pipe line 32.

Moreover, in the embodiment, the communication passage 40 is branch coupled to the evaporated gas supply passage 30 in a pipe line between the fuel tank 10 and the canister 50.

Communication Passage 40

The communication passage 40 is, as described above, a pipe line that couples the upper end portion (the fuel inlet 20A) side of the filler pipe 20 to the evaporated gas supply passage 30.

In the embodiment, the communication passage 40 is mainly used for:
(a) reducing the mixing amount (fresh air inflow amount) of air into the fuel, by recirculating the evaporated gas pushed out from the fuel tank 10 into the evaporated gas supply passage 30 in supply oil, to the filler pipe 20; and
(b) in an abnormality diagnosis related to an abnormality diagnosis method, which is described later, the negative pressure pump 56 is driven to make the inside of the filler pipe 20 be the negative pressure.

Canister 50

The canister 50 includes an adsorber (for example, activated charcoal, not illustrated) in an inside thereof that adsorbs the evaporated gas, and is a device for adsorbing the evaporated gas supplied (emitted) via the evaporated gas supply passage 30 to the adsorber, and causing the evaporated gas adsorbed to the adsorber via a purge passage 51 to purge (release) to an inlet system of an engine (not illustrated). Note that, the evaporated gas purged to the inlet system of the engine is combusted in a combustion chamber of the engine.

To the canister 50 according to the embodiment, attached are the evaporated gas supply passage 30 in which the evaporated gas circulates, and a leakage check module 55 for performing a leakage check (leakage diagnosis) of a pipe line (hereinafter, referred to as "evaporated gas circulation system") including the canister 50 and the purge passage 51.

The leakage check using such the leakage check module 55 has now been known, and a detailed description thereof is thus omitted, and also in the embodiment, the leakage check is performed by a procedure including:
(a) sealing, after making the "evaporated gas circulation system" be the negative pressure, the "evaporated gas circulation system" by closing a control valve (not illustrated) provided in the pipe line of the purge passage 51; and
(b) then checking a holding state of the negative pressure in the "evaporated gas circulation system" at that time.

The leakage check module 55 according to the embodiment includes the negative pressure pump 56 for making the "evaporated gas circulation system" be the negative pressure, a second pressure sensor 57 for checking a holding state of the negative pressure in the "evaporated gas circulation system", and a switching valve (not illustrated). In one example, the negative pressure pump 56 and the second pressure sensor 57 described above respectively may serve as a "pressure change device" and a "second pressure measurement device".

The switching valve is, for example, a valve capable of switching an atmosphere open position at which the canister 50 is opened to the atmosphere and a negative pressure possible position at which the canister 50 is coupled to the negative pressure pump 56 to make the "evaporated gas circulation system" be the negative pressure, and can be configured as a control valve such as an electromagnetic valve.

As will be described in details later, in the embodiment, the leakage check module 55 is also used for a diagnosis whether the communication passage 40 is blocked in addition to the leakage check (leakage diagnosis) of the "evaporated gas circulation system".

Engine Control Unit 60

The engine control unit 60 (ECU: Engine Control Unit) is a control device for performing comprehensive control of a vehicle, and includes a central arithmetic processing device (CPU: Central Processing Unit), a storage device (for example, ROM; Read Only Memory), an input/output device, a timer, and the like.

As will be described in details later, the engine control unit 60 performs a control process (control process related to the abnormality diagnosis method) of determining whether the communication passage 40 is blocked, on the basis of diagnosis reference information (in the embodiment, a differential pressure value between the pressure in the filler pipe 20 and the pressure in the evaporated gas supply passage 30, serving as a diagnosis reference) stored in the storage device. In one example, the abovementioned abnormality diagnosis method may serve as an "abnormality diagnosis method".

The engine control unit 60 according to the embodiment is electrically coupled to the first pressure sensor 23, the leakage check module 55 (the negative pressure pump 56 and the second pressure sensor 57), a warning lamp 61, and the like.

The warning lamp 61 is provided, for example, to an instrument panel of a driver's seat, and is a device that lights on when it has been determined that the communication passage 40 is blocked as a result of the control process related to the abnormality diagnosis method, which is described later, to give an occupant a warning (notification of the fact). Note that, such a warning is not limited to the lighting by the warning lamp 61, but, for example, an image indicating the fact may be displayed on a display unit such as a liquid crystal display, or sound can also be emitted from a speaker or the like.

Configuration of Abnormality Diagnosis Method

Next, the control process (hereinafter, referred to as "abnormality diagnosis control process") that is related to the abnormality diagnosis method and is executed in the engine control unit 60 will be described with reference to FIG. 1 to FIG. 3. Note that, in the embodiment, the description will be made on the precondition of a state where a power supply is supplied to the engine control unit 60, for example, a state where a so-called ignition key (not illustrated) is turned on, or a state where a power supply from a backup power supply (not illustrated) is supplied even in a state where the ignition key is turned off.

Step S100

As illustrated in FIG. 2, the "abnormality diagnosis control process" starts by performing processing (processing at a step S100) of determining whether a vehicle is stationary.

Such a determination can be made on the basis of a speed sensor (not illustrated) that measures the speed of the vehicle, for example.

As illustrated in FIGS. 1 and 2, if the engine control unit 60 determines that the vehicle is stationary, the engine control unit 60 moves the process to a step S200, whereas if the engine control unit 60 determines that the vehicle is not stationary, the engine control unit 60 ends the "abnormality diagnosis control process".

Step S200

The engine control unit 60 performs processing of driving the negative pressure pump 56 of the leakage check module 55 at the step S200.

For example, the engine control unit 60 performs, after performing control similar to that of a leakage check of the "evaporated gas circulation system", in other words, control of sealing the "evaporated gas circulation system" (for example, control of blocking a control valve (not illustrated) that is provided in a pipe line of the purge passage 51), control of driving the negative pressure pump 56.

In the embodiment, when the negative pressure pump 56 is driven:
(a) the evaporated gas in the fuel tank 10, and the evaporated gas remaining in each pipe line of the evaporated gas supply passage 30, the branched pipe line 32, the communication passage 40, and the purge passage 51 are adsorbed by the adsorber of the canister 50, and are then released from an atmospheric opening (not illustrated) of the leakage check module 55 to the atmosphere; and
(b) the inside of the fuel tank 10 and the inside of the abovementioned each pipe line are gradually made to be the negative pressure. Note that, in the embodiment, in a case where the communication passage 40 is not blocked (in a case where the communication passage 40 is normal), the filler pipe 20 to be communicated with and coupled to the communication passage 40 is also sealed by the filler cap 21 and the backflow prevention valve 22, and thus is made to be the negative pressure when the negative pressure pump 56 is driven.

After performing the processing of deriving the negative pressure pump 56, the engine control unit 60 moves the process to a step S300.

Step S300

The engine control unit 60 performs processing of determining whether a differential pressure between a pressure value (pressure in the filler pipe 20, hereinafter, referred to as a "first pressure value P1") of the first pressure sensor 23 and a pressure value (the internal pressure in the fuel tank 10, the evaporated gas supply passage 30, and the like, hereinafter, referred to as a "second pressure value P2") of the second pressure sensor 57 is equal to or less than a value (a predetermined reference differential pressure value Pt serving as a reference of the diagnosis) of the diagnosis reference information stored in the storage device, at the step S300. In one example, the "first pressure value P1", the "second pressure value P2", and the reference differential pressure value Pt described above may respectively serve as a "first pressure value", a "second pressure value", and a "reference differential pressure value".

Herein, the transition of pressure of the "first pressure value P1" and the "second pressure value P2" will be described with reference to FIGS. 1 and 3 separately in a case where the communication passage 40 is not blocked (hereinafter, this state is referred to as a "normal state") and a case where the communication passage 40 is blocked (hereinafter, this state referred to as an "abnormal state").

Firstly, the transition of pressures of the "first pressure value P1" and the "second pressure value P2" in the case where the communication passage 40 is in the "normal state" will be described.

As illustrated in FIGS. 1 and 3, the second pressure sensor 57 is provided in the vicinity of the negative pressure pump 56, so that when the negative pressure pump 56 is driven, the "second pressure value P2" immediately starts to decrease without being delayed from the drive, and gradually decreases to a predetermined pressure value in accordance with the ability of the negative pressure pump 56.

In contrast, the first pressure sensor 23 is provided at a position comparatively distant from the negative pressure pump 56, so that the "first pressure value P1" starts to decrease by being slightly delayed from the drive of the negative pressure pump 56, and similar to the "second pressure value P2", gradually decreases to a predetermined pressure value in accordance with the ability of the negative pressure pump 56.

In other words, in the case where the communication passage 40 is in the "normal state", the "first pressure value P1" and the "second pressure value P2" indicate the roughly similar pressure waveforms, and after a predetermined time has elapsed, become roughly the same value (differential pressure "0" or a value approximate to this value).

In contrast, in the case where the communication passage 40 is in the "abnormal state", the timing at which the "first pressure value P1" starts to decrease is necessarily delayed because the evaporated gas remaining in the side closer to the filler pipe 20 from a blockage portion C (see FIG. 1) moves via the blockage portion C serving as a resistance to the side of the evaporated gas supply passage 30, compared with the case where the communication passage 40 is in the "normal state".

Thereafter, the "first pressure value P1" comparatively slowly decreases to gradually increase a pressure difference with the "second pressure value P2". Note that, it is needless to say that in a case where the communication passage 40 is blocked to the extent that the gas cannot circulate, even when the negative pressure pump 56 is driven, the "first pressure value P1" does not decrease.

In this manner, in the embodiment, it can be determined whether the communication passage 40 is blocked based on whether the differential pressure between the "first pressure value P1" and the "second pressure value P2" after a predetermined time has elapsed from when the negative pressure pump 56 was driven is equal to or less than the predetermined reference differential pressure value Pt (see FIG. 2).

As illustrated in FIGS. 1 and 2, if the engine control unit 60 determines that the differential pressure between the "first pressure value P1" and the "second pressure value P2" is equal to or less than the reference differential pressure value Pt, the engine control unit 60 moves the process to a step S400, whereas if the engine control unit 60 determines that the differential pressure is not equal to or less than the reference differential pressure value Pt, the engine control unit 60 moves the process to a step S500.

Step S400

After the engine control unit 60 has determined that the communication passage 40 is in the "normal state" at the step S400, the engine control unit 60 moves the process to a step S700.

Step S500

After the engine control unit 60 has determined that the communication passage 40 is in the "abnormal state" at the step S500, the engine control unit 60 moves the process to a step S600. In one example, the processing at the step S300 and the processing at the step S500 may serve as "diagnosing".

Step S600

The engine control unit 60 performs processing (notification processing) of outputting a notification signal indicating that the communication passage 40 is in the "abnormal state" to a notification unit such as the warning lamp 61 and the like, at the step S600. Accordingly, the occupant or the like is capable of recognizing that the communication passage 40 is in the "abnormal state".

After the engine control unit 60 has performed the abovementioned notification processing, the engine control unit 60 moves the process to a step S700. Note that, although, in the embodiment the notification processing is performed simply in the case where the communication passage 40 is in the "abnormal state", the notification processing like the step S600 is capable of being performed also in the case where the communication passage 40 is in the "normal state".

Step S700

The engine control unit 60 performs processing of stopping the negative pressure pump 56 being driven at the step S700, and ends the "abnormality diagnosis control process".

As in the foregoing, in the embodiment, the backflow prevention valve 22 is provided to the filler pipe 20, so that in the case where the communication passage 40 is in the "abnormal state", the pipe line in the blockage portion C at the side of the filler pipe 20 (the communication passage 40 at the side of the filler pipe 20 and the filler pipe 20) can be used as, so to speak, a sealed space S (independent space, see FIG. 1) independent of the pipe line at the side of the evaporated gas supply passage 30 (the communication passage 40 at the side of the evaporated gas supply passage 30 and the evaporated gas supply passage 30).

In other words, in the embodiment, in the case where the communication passage 40 is in the "abnormal state", the pipe line at the side of the filler pipe 20 and the pipe line at the side of the evaporated gas supply passage 30 serve as different spaces, so that when the inside of the pipe line at the side of the evaporated gas supply passage 30 is made to be the negative pressure, the pressure (first pressure value P1) in the pipe line at the side of the filler pipe 20:

(a) in the case where the communication passage 40 is in the "normal state", transitions with a value similar to the pressure in the pipe line at the side of the evaporated gas supply passage 30 (second pressure value P2); and (b) in the case where the communication passage 40 is in the "abnormal state", transitions with a value different from the pressure in the pipe line at the side of the evaporated gas supply passage 30 (second pressure value P2) (see FIG. 3).

In this manner, in the embodiment, the first pressure value P1 in the pipe line at the side of the filler pipe 20 is compared with the second pressure value P2 in the pipe line at the side of the evaporated gas supply passage 30 to allow a diagnosis as to whether the communication passage 40 is blocked to be performed.

Accordingly, in the embodiment, with the comparatively simple configuration, a blockage state of the communication passage 40 can be reliably grasped, so that it is possible to try to prolong the life of the canister 50, and eventually, to contribute to the prevention of the air pollution.

Note that, in the embodiment, the configuration in which the entire "evaporated gas circulation system" including the evaporated gas supply passage 30 is made to be the negative pressure has been employed, however, it is possible to check the blockage state of the communication passage 40 by making only the evaporated gas supply passage 30 to which the communication passage 40 is coupled be the negative pressure.

Such a configuration in which only the evaporated gas supply passage 30 is made to be the negative pressure can be implemented, for example, by:

(a) providing valves (for example, electromagnetic valves) respectively to sides of the fuel tank 10 and the canister 50 in the evaporated gas supply passage 30 at the coupling position to which the communication passage 40 is coupled; and (b) providing a negative pressure pump to make the evaporated gas supply passage 30 between the abovementioned respective valves be the negative pressure.

Moreover, it is possible to check the blockage state of the communication passage 40 by not only the case where the inside of the evaporated gas supply passage 30 is made to be the negative pressure but being pressurized, so that a pressurization pump can be used in place of the negative pressure pump as described above.

In addition, the negative pressure pump (pressurization pump) is not limited to be coupled to the pipe line at the side of the evaporated gas supply passage 30, but may be coupled to the filler pipe 20.

Moreover, the blockage state of the communication passage 40 can be checked without using the negative pressure pump 56 (or pressurization pump).

Figure 4:
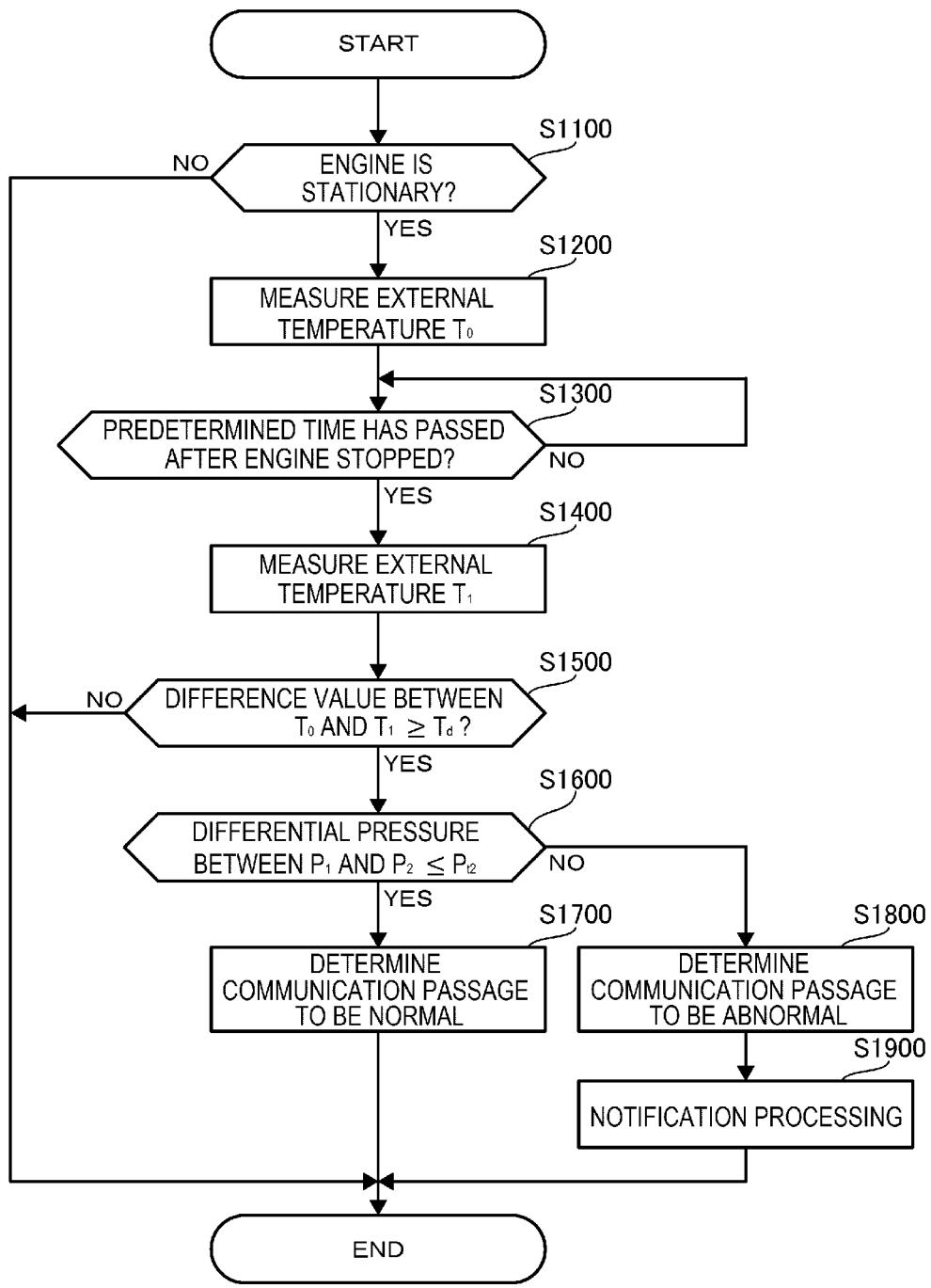
FIG. 4 is a flowchart of an abnormality diagnosis control process indicating an example of an abnormality diagnosis method according to another embodiment.
Figure 5:
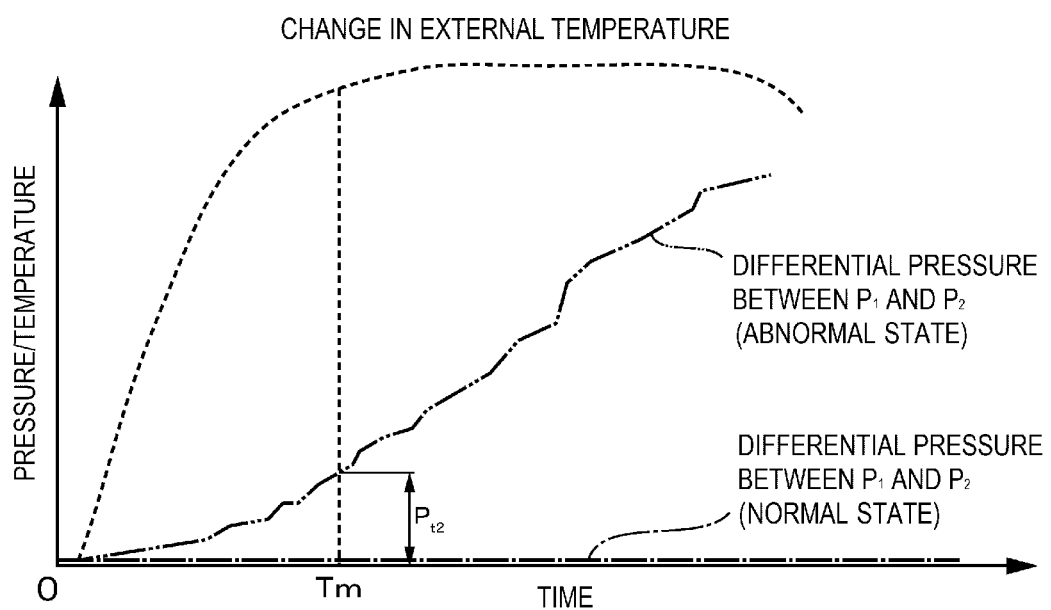
FIG. 5 is a graph illustrating transition of a differential pressure between a pressure in a filler pipe and a pressure in the evaporated gas supply passage in the abnormality diagnosis according to the another embodiment.

Hereinafter, an embodiment (hereinafter, referred to as "another embodiment") according to such a configuration will be described with reference to FIGS. 1, 4, and FIG. 5. FIG. 4 is a flowchart of an abnormality diagnosis control process indicating an example of an abnormality diagnosis method according to the another embodiment. FIG. 5 is a graph illustrating transition of a differential pressure between the pressure in the filler pipe and the pressure in the evaporated gas supply passage in an abnormality diagnosis according to the another embodiment. Note that, in the following description, configurations different from those in the abovementioned embodiment are described, and similar configuration are denoted with the same reference numerals and description thereof are omitted.

Configuration of Another Embodiment

As illustrated in FIG. 1, the fuel tank system 1 according to the another embodiment is provided with a temperature sensor 62 capable of measuring the external temperature. Such the temperature sensor 62 can be provided at an appropriate position of a vehicle. In one example, the abovementioned temperature sensor 62 may serve as a "temperature measurement device".

As will be described in details later, the engine control unit 60 performs control of determining whether the communication passage 40 is blocked on a condition that (a) the engine is stationary, and (b) the external temperature changes beyond a predetermined temperature, on the basis of the first pressure value P1 (see FIG. 5) measured by the first pressure sensor 23 and the second pressure value P2 (see FIG. 5) measured by the second pressure sensor 57.

In other words, in the embodiment, the blockage state of the communication passage 40 is diagnosed by focusing attention on a fact that the evaporated gas and the air in the filler pipe 20 easily expand when the external temperature has changed, in other words, in the case where the communication passage 40 is in the "abnormal state", with the change in the external temperature, the pressure in the pipe line at the side of the filler pipe 20 increase easier than the pressure in the pipe line at the side of the evaporated gas supply passage 30.

Abnormality Diagnosis Control Process According to Another Embodiment

Next, an "abnormality diagnosis control process" according to the another embodiment will be described on the basis of FIGS. 1, 4, and 5. Note that, in the another embodiment, the description will be made on the precondition of a state where a power supply is supplied to the engine control unit 60, for example, a state where a power supply from a backup power supply (not illustrated) is supplied even in a state where the ignition key is turned off.

Step S1100

As illustrated in FIG. 4, the "abnormality diagnosis control process" according to the another embodiment starts by performing processing (the processing at the step S1100) of determining whether the engine is stationary.

Such determination can be made, for example, on the basis of an engine speed detected by an engine rotation sensor.

As illustrated in FIGS. 1 and 4, if the engine control unit 60 determines that the engine is stationary, the engine control unit 60 moves the process to a step S1200, whereas if the engine control unit 60 determines that the engine is not stationary, the engine control unit 60 ends the "abnormality diagnosis control process".

Step S1200

The engine control unit 60 performs processing of measuring an external temperature T0 (external temperature immediately after the engine has stopped) using the temperature sensor 62 at the step S1200, and thereafter moves the process to a step S1300. In one example, the abovementioned external temperature T0 may serve as a "first temperature that serves as a reference temperature".

Step S1300

The engine control unit 60 performs processing of determining whether a predetermined reference time Tm (see FIG. 5) has elapsed after the engine has stopped at the step S1300.

If the engine control unit 60 determines that the reference time Tm has elapsed, the engine control unit 60 moves the process to a step S1400, whereas if the engine control unit 60 determines that the reference time Tm has not elapsed, the engine control unit 60 repeatedly executes the processing (the processing at the step S1300).

Step S1400

The engine control unit 60 performs processing of measuring an external temperature T1 (external temperature after the reference time Tm has elapsed from when the engine stopped) using the temperature sensor 62 at the step S1400, and thereafter moves the process to a step S1500. In one example, the abovementioned external temperature T1 may serve as a "second temperature".

Step S1500

The engine control unit 60 performs processing of determining whether a difference value between the external temperature T0 measured at the step S1200 and the external temperature T1 measured at the step S1400 is equal to or more than a predetermined reference temperature difference Td at the step S1500. In one example, the abovementioned reference temperature difference Td may serve as a "reference temperature difference".

If the engine control unit 60 determines that the difference value between the external temperature T0 and the external temperature T1 is equal to or more than the reference temperature difference Td, the engine control unit 60 moves the process to a step S1600.

On the other hand, if the engine control unit 60 determines that the difference value between the external temperature T0 and the external temperature T1 is less than the reference temperature difference Td, the engine control unit 60 ends the "abnormality diagnosis control process". This is because when the external temperature hardly changes after the engine has stopped, even if the communication passage 40 is blocked, no pressure difference, which is described later, between the "first pressure value P1" and the "second pressure value P2" is generated, and erroneous determination (determination as the communication passage 40 not being blocked) may be made (see FIG. 5).

Step S1600

The engine control unit 60 performs processing of determining whether the differential pressure between the "first pressure value P1" and the "second pressure value P2" is equal to or less than a predetermined reference differential pressure value Pt2 at the step S1600. In one example, the abovementioned reference differential pressure value Pt2 may serve as a "reference differential pressure value".

Herein, transition of the differential pressure between the "first pressure value P1" and the "second pressure value P2" will be described with reference to FIGS. 1 and 5 separately in the case where the communication passage 40 is in the "normal state" and in the case where the communication passage 40 is in the "abnormal state".

Firstly, the transition of the differential pressure between the "first pressure value P1" and the "second pressure value P2" in the case where the communication passage 40 is in the "normal state" will be described.

As illustrated in FIG. 1, in the case where the communication passage 40 is in the "normal state", the pipe line at the side of the filler pipe 20 communicates with the pipe line at the side of the evaporated gas supply passage 30 via the communication passage 40, similar to the abovementioned embodiment, the "first pressure value P1" and the "second pressure value P2" respectively transition in the roughly same values (see FIG. 3).

As a result, in the case where the communication passage 40 is in the "normal state", the differential pressure between the "first pressure value P1" and the "second pressure value P2" transitions by keeping roughly "0" without receiving an influence of a change in the external temperature (see FIG. 5).

On the other hand, in the case where the communication passage 40 is in the "abnormal state", the pipe line at the side of the filler pipe 20 forms, as has been described in the abovementioned embodiment, the sealed space S (independent space) independent of the pipe line at the side of the evaporated gas supply passage 30.

Moreover, the pressure ("first pressure value P1") in the pipe line at the side of the filler pipe 20 when receiving an influence of a change in the external temperature tends to increase more than the pressure ("second pressure value P2") in the pipe line at the side of the evaporated gas supply passage 30 does as described above, so that the differential pressure between the "first pressure value P1" and the "second pressure value P2" increases as the time has elapsed, as illustrated in FIG. 5.

In this manner, in the embodiment, it can be determined whether the communication passage 40 is blocked based on whether the differential pressure between the "first pressure value P1" and the "second pressure value P2" is equal to or less than the predetermined reference differential pressure value Pt2 (see FIG. 5).

As illustrated in FIGS. 1 and 4, if the engine control unit 60 determines that the differential pressure between the "first pressure value P1" and the "second pressure value P2" is equal to or less than the reference differential pressure value Pt2, the engine control unit 60 moves the process to a step S1700, whereas if the engine control unit 60 determines that the differential pressure is not equal to or less than the reference differential pressure value Pt2, the engine control unit 60 moves the process to a step S1800.

Step S1700

After the engine control unit 60 has determined that the communication passage 40 is in the "normal state" at the step S1700, the engine control unit 60 ends the "abnormality diagnosis control process".

Step S1800

After the engine control unit 60 has determined that the communication passage 40 is in the "abnormal state" at the step S1800, the engine control unit 60 moves the process to a step S1900. Note that, in one example, the processing at the step S1600 and the processing at the step S1800 may serve as "diagnosing".

Step S1900

The engine control unit 60 performs processing (notification processing) of outputting a notification signal indicating that the communication passage 40 is in the "abnormal state" to the notification unit such as the warning lamp 61 and the like, at the step S1900. Accordingly, the occupant or the like is capable of recognizing that the communication passage 40 is in the "abnormal state".

After the engine control unit 60 has performed the abovementioned notification processing, the engine control unit 60 ends the "abnormality diagnosis control process". Note that, in the embodiment, although the notification processing is performed simply in the case where the communication passage 40 is in the "abnormal state", notification processing similar to this processing is capable of being performed also in the case where the communication passage 40 is in the "normal state".

As in the foregoing, with the another embodiment, an effect similar to that of the abovementioned embodiment can be obtained, in addition, it is possible to reduce the consumption of electric power because a diagnosis of the blockage state of the communication passage 40 can be made without using the negative pressure pump and the like, but using the change in the external temperature.

Note that, in the abovementioned respective embodiments, as a pressure sensor that measures a pressure in the evaporated gas supply passage 30, the second pressure sensor 57 of the leakage check module 55 is used, however, as long as the pressure can be measured, for example, a pressure sensor that measures a pressure in the fuel tank 10 may be used.

Moreover, in the abovementioned respective embodiments, the backflow prevention valve 22 is provided at the tip in the lower end portion of the filler pipe 20, however, as long as the position is at a downstream side from the position at which the communication passage 40 is branch coupled, the backflow prevention valve 22 may be provided in the pipe line of the filler pipe 20.

In the foregoing, the embodiments to which the disclosure made by the inventor is applied has been described. It is noted that the description and drawings in the embodiments are a part of the disclosure, but do not limit the disclosure. In other words, it should be noted that other embodiments that are made based on the embodiments by those skilled in the art, examples, and operation techniques are all included in the scope of the disclosure.

The engine control unit 60 in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the engine control unit 60 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the engine control unit 60 illustrated in FIG. 1.

The invention claimed is:

1. A fuel tank system for a vehicle, the fuel tank system comprising:
    a fuel tank configured to store fuel;
    a fuel supply passage configured to supply the fuel to the fuel tank;
    a canister configured to adsorb evaporated fuel gas generated in the fuel tank;
    an evaporated fuel gas supply passage that couples the fuel tank to the canister, the evaporated fuel gas supply passage being configured to supply the evaporated fuel gas in the fuel tank to the canister;
    a communication passage that fluidly connects the fuel supply passage and the evaporated fuel gas supply passage;
    a backflow prevention device provided in a pipe line of the fuel supply passage between the fuel tank and the communication passage, the backflow prevention device being configured to prevent a backflow of the fuel from the fuel tank;
    a first pressure measurement device configured to measure a pressure in the fuel supply passage;
    a second pressure measurement device configured to measure a pressure in the evaporated fuel gas supply passage; and
    a control device configured to diagnose a blockage state of the communication passage on a basis of a first pressure value measured by the first pressure measurement device and a second pressure value measured by the second pressure measurement device, wherein the control device is configured to diagnose the communication passage as being blocked when a differential pressure between the first pressure value and the second pressure value exceeds a predetermined reference differential pressure value.

2. The fuel tank system according to claim 1, further comprising:

a pressure change device configured to change the pressure in the evaporated fuel gas supply passage, wherein the control device is configured to diagnose the blockage state of the communication passage on the basis of the first pressure value and the second pressure value after the pressure change device has changed the pressure in the evaporated fuel gas supply passage.

3. The fuel tank system according to claim 1, further comprising:

a temperature measurement device configured to measure an external temperature of the vehicle, wherein the control device is configured to diagnose the blockage state of the communication passage on a condition that a temperature difference between a first temperature that serves as a reference temperature and that is measured by the temperature measurement device and a second temperature measured after the first temperature exceeds a predetermined reference temperature difference.

4. An abnormality diagnosis method of diagnosing an abnormality of a fuel tank system of a vehicle, the method comprising:

diagnosing a blockage state of a communication passage, wherein the fuel tank system comprises:
   a fuel tank configured to store fuel;
   a fuel supply passage configured to supply the fuel to the fuel tank;
   a canister configured to adsorb evaporated fuel gas generated in the fuel tank;
   an evaporated fuel gas supply passage that couples the fuel tank to the canister, the evaporated fuel gas supply passage being configured to supply the evaporated fuel gas in the fuel tank to the canister;
   the communication passage that fluidly connects the fuel supply passage and the evaporated fuel gas supply passage;
   a backflow prevention device provided in a pipe line of the fuel supply passage between the fuel tank and the communication passage, the backflow prevention device being configured to prevent a backflow of the fuel from the fuel tank;
   a first pressure measurement device configured to measure a pressure in the fuel supply passage; and
   a second pressure measurement device configured to measure a pressure in the evaporated fuel gas supply passage, and the diagnosing comprises diagnosing the communication passage as being blocked when a differential pressure between a first pressure value measured by the first pressure measurement device and a second pressure value measured by the second pressure measurement device exceeds a predetermined reference differential pressure value.

5. A fuel tank system of a vehicle, the fuel tank system comprising:

a fuel tank configured to store fuel;
a fuel supply passage configured to supply the fuel to the fuel tank;
a canister configured to adsorb evaporated fuel gas generated in the fuel tank;
an evaporated fuel gas supply passage that couples the fuel tank with the canister, the evaporated fuel gas supply passage being configured to supply the evaporated fuel gas in the fuel tank to the canister;
a communication passage that fluidly connects the fuel supply passage and the evaporated fuel gas supply passage;
a backflow prevention device provided in a pipe line of the fuel supply passage between the fuel tank and the communication passage, the backflow prevention device being configured to prevent a backflow of the fuel from the fuel tank;
a first pressure measurement device configured to measure a pressure in the fuel supply passage;
a second pressure measurement device configured to measure a pressure in the evaporated fuel gas supply passage; and
circuitry configured to diagnose a blockage state of the communication passage on a basis of a first pressure value measured by the first pressure measurement device and a second pressure value measured by the second pressure measurement device, wherein the circuitry is configured to diagnose the communication passage as being blocked when a differential pressure between the first pressure value and the second pressure value exceeds a predetermined reference differential pressure value.

* * * * *